(12) United States Patent
Rye et al.

(10) Patent No.: US 7,414,543 B2
(45) Date of Patent: Aug. 19, 2008

(54) MULTIPLE MINIATURE AVIONIC DISPLAYS

(75) Inventors: Jeffrey M. Rye, Roseville, MN (US); Michael C. Dorneich, St. Paul, MN (US); Aaron J. Gannon, Anthem, AZ (US)

(73) Assignee: Honeywell International Inc., Morristown, NJ (US)

( * ) Notice: Subject to any disclaimer, the term of this patent is extended or adjusted under 35 U.S.C. 154(b) by 152 days.

(21) Appl. No.: 11/116,971

(22) Filed: Apr. 28, 2005

(65) Prior Publication Data

US 2006/0244636 A1    Nov. 2, 2006

(51) Int. Cl.
   *G08B 21/00* (2006.01)
(52) U.S. Cl. .................. 340/945; 340/961; 340/963; 340/970; 340/995.1; 340/995.13; 340/995.17; 701/14; 701/301
(58) Field of Classification Search .......... 340/945, 340/961, 963, 968, 970, 995.1, 995.13, 995.17; 342/65, 179, 181, 182; 701/14, 301
See application file for complete search history.

(56) References Cited

U.S. PATENT DOCUMENTS

| | | | | |
|---|---|---|---|---|
| 4,635,030 A | * | 1/1987 | Rauch | 340/945 |
| 6,020,831 A | * | 2/2000 | Nishida et al. | 340/945 |
| 6,038,498 A | * | 3/2000 | Briffe et al. | 701/3 |
| 6,043,757 A | * | 3/2000 | Patrick | 340/963 |
| 6,489,916 B2 | * | 12/2002 | Block | 342/65 |
| 6,700,482 B2 | * | 3/2004 | Ververs et al. | 340/500 |

* cited by examiner

*Primary Examiner*—Hung Nguyen
(74) *Attorney, Agent, or Firm*—Ingrassia Fisher & Lorenz

(57) ABSTRACT

A display screen for displaying multiple sets of information is provided. In one embodiment, an aviation display screen includes a main window and a plurality of miniature windows. The main window is adapted to illustrate one set of information. Each miniature window is adapted to display a set of avionic information. The avionic display is further adapted to toggle a select set of avionic information in one of the miniature windows into the main window.

26 Claims, 2 Drawing Sheets

MULTIPLE MINIATURE AVIONIC DISPLAYS

GOVERNMENT LICENSE RIGHTS

The U.S. Government may have certain rights in the present invention as provided for by the terms of Contract No. NAS1-00107 awarded by the NASA Langley Research Center. The invention described herein was made in the performance of work under NASA Contract No. NAS1-00107 and is subject to the provisions of Section 305 of the National Aeronautics and Space Act of 1958 (42 U.S.C. 2457).

TECHNICAL FIELD

The present invention relates generally to the display of information and in particular to the display of avionic information via multiple miniature displays.

BACKGROUND

Current avionic displays are typically designed to display different sets of information either on separate displays or only one set of information at a time. This is required because the displays typically display different information in a similar way. For example, both threatening terrain regions and severe weather are typically illustrated with color regions on a display screen. Moreover, it is common for terrain and weather information to be displayed using similar color palettes. For example, both terrain and weather radar may be displayed using the same colors red, yellow and green to represent increasing degrees of threat, safety criticality, or need for flight crew awareness or response. Red is typically designated as indicating either the most severe weather or the most critical terrain relating to the position of the aircraft. The green color is typically designated as indicating the least severe weather or the least critical terrain relating to the current position of the aircraft. Moreover, the yellow color is typically designated as indicating weather that has a severity level somewhere between the severity level designated by the red and green colors and a terrain that is in between the terrain indicated by the red and green colors in relation to the position of the plane.

To avoid confusion in displaying weather and terrain information, separate displays are used or the information is toggled between screens of the same display. However, there are limitations to this implementation. For example, with separate screens, the pilot must be able to integrate the weather and terrain information mentally in order to avoid conflicts. This takes time and can be confusing especially when the screens may provide the information in different size grids (scale) or orientation. Moreover, in critical situations the use of different screen or toggling between screens is detrimental in conveying the needed information is a fast an effective manner.

For the reasons stated above and for other reasons stated below which will become apparent to those skilled in the art upon reading and understanding the present specification, there is a need in the art for a method of conveying different information simultaneously in an efficient and effective manner on a single display screen.

SUMMARY OF INVENTION

The above-mentioned problems of current systems are addressed by embodiments of the present invention and will be understood by reading and studying the following specification.

In one embodiment, an avionic display screen is provided. The aviation display screen includes a main window and a plurality of miniature windows. The main window is adapted to illustrate one set or class of information. Each miniature window is adapted to display one set or class of avionic information. The avionic display is further adapted to toggle a select set of avionic information in one of the miniature windows into the main window.

In another embodiment, another avionic display screen is disclosed. The display screen includes a relatively large window and first, second and third windows. The relatively large window is adapted to display a set of avionic information. The first miniature window is adjacent the relatively large window and is adapted to display traffic information. The second miniature window is adjacent the relatively large window and is adapted to display weather information. The third miniature window is also adjacent the relatively large window and is adapted to display terrain information. The set of avionic information displayed in the relatively large window is selected among the first, second and third miniature windows.

In still another embodiment, a method of displaying avionic information on a single display screen is provided. The method includes displaying a set of avionic information in each of a plurality of miniature windows on the display screen and displaying a select one of the sets of the avionic information from the miniature windows on a main relatively large window on the display screen.

In further another embodiment, a method of displaying avionic information on a single display window is provided. The method comprises displaying traffic information in a first miniature window. Displaying weather information in a second miniature window. Displaying terrain information in a third miniature window and displaying a select one of the traffic, weather and terrain information in a relatively large window that is adjacent the first, second and third miniature windows.

In another embodiment, a computer-readable medium having computer-executable instructions for performing a method is provided. The method includes displaying a set of avionic information in each of a plurality of miniature windows on the display screen and displaying a select one of the sets of the avionic information from the miniature windows on a main relatively large window on the display screen.

In yet still another embodiment, a display to display multiple sets of information simultaneously is provided. The display comprises a means for displaying a set of avionic information in a main window. A means for displaying a set of avionic information in each of a plurality of miniature windows and a means for toggling a select of avionic information in one of the miniature windows into the main window.

BRIEF DESCRIPTION OF THE DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a display that effectively conveys different sets of information on a single display screen. In particular, in one embodiment, a large window along with smaller windows (multiple miniatures) are used to display more than one set of information. Each of thee miniatures shows a scaled down version of information overlaying the same area location fill (or background) displayed in the larger window. This allows for more than one set of information to be shown on a display screen at the same time in a non-confusing manner.

Figure 1:
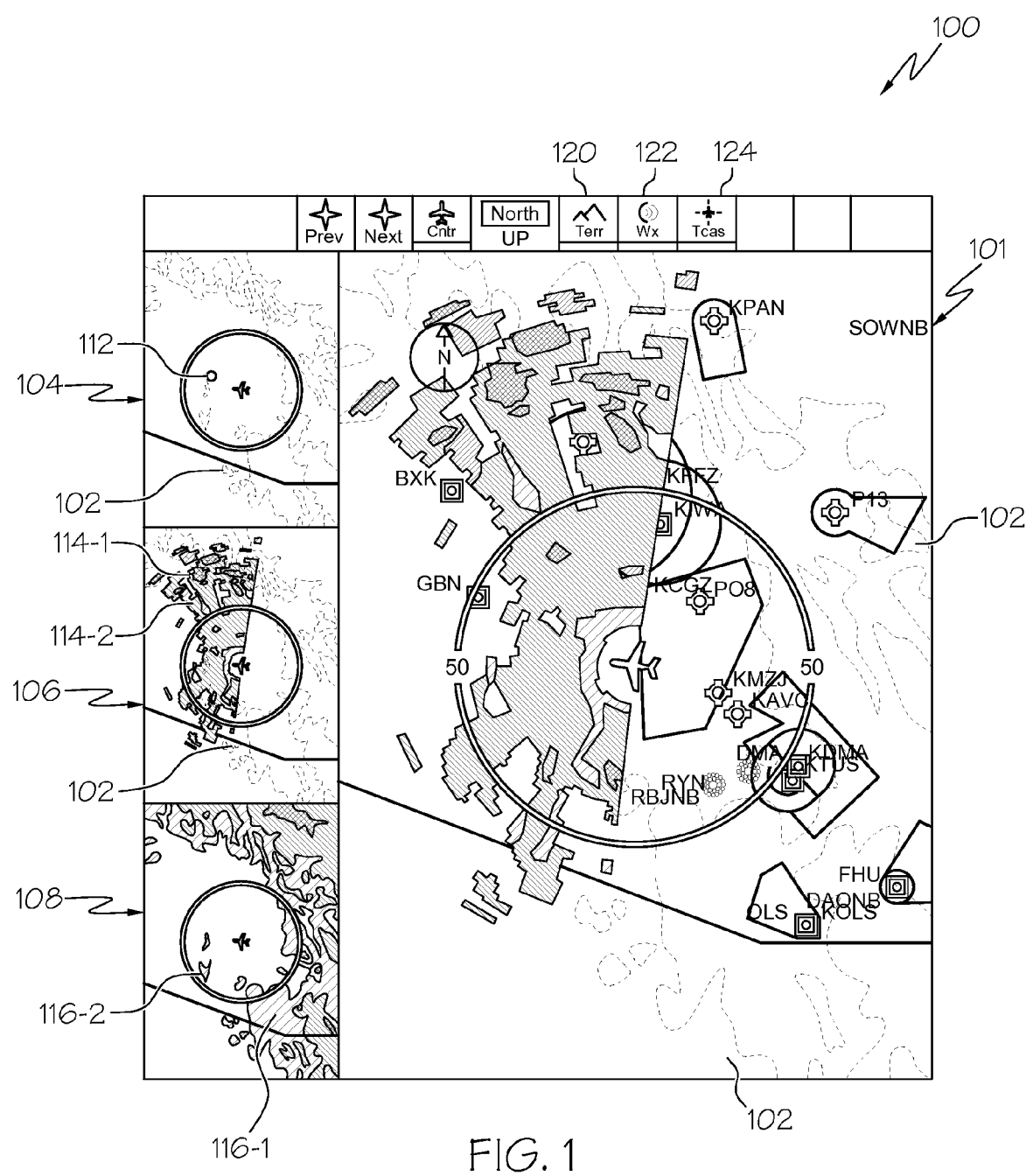
FIG. 1 is a display screen of one embodiment of the present invention.

Referring to FIG. 1, a display screen 100 of one embodiment of the present invention is illustrated. As illustrated, the display screen 100 includes area fill 102. The area fill 102 is a background of non-threatening terrain which is illustrated in the large window 101 and the smaller windows (miniature windows) 104, 106 and 108. The area fill 102 is typically illustrated with the used of neutral colors or no color at all. Moreover, the area fill 102 can also be generally referred to the situation awareness terrain 102. Each miniature window 104, 106 and 108 illustrates a specific set of information. In the embodiment of FIG. 1, miniature window 104 illustrates traffic 112. Miniature window 106 illustrates weather regions 114-1 through 114-2. The weather regions 114-1 and 114-2 are distinguished from each other by color. In this illustration, only two different colors are present, designated generally as 114-1 and 114-2. This indicates two different levels of severity of the weather 114-1 and 114-2 in a specific location. It is understood that a different numbers of colors and severity levels may appear and that this invention is not limited in number and severity classifications.

Miniature window 108 illustrates terrain regions which are generally designated as 116-1 and 116-2. The terrain regions 116-1 and 116-2 are used to display terrain having a level of concern. These regions are also distinguished from each other by color. In this illustration, only two different colors are present, designated generally as 116-1 and 116-2. This indicates two different levels of concern of the terrain 116-1 and 116-2 in a specific location. It is understood that different numbers of colors and concern levels may appear and that this invention is not limited in number and severity classification.

In embodiments of the present invention, the information in the miniature windows 104, 106 and 108 can be displayed in the large window 101 upon selection by the operator. The large window 101 can also be referred to as the main window 101. For example, in the embodiment of FIG. 1, the weather has been selected to be viewed in the large window 101. In one embodiment, the selection of the set of information to be displayed in the large window 101 is accomplished by depressing an activation button. For example, referring to FIG. 1, the terrain regions 116-1 through 116-2 is illustrated in the large window 101 by depressing activation switch 120. The weather areas 114-1 through 114-2 are illustrated in the large window by depressing activation switch 122. Moreover, the traffic 112 is illustrated in the large window 101 by depressing activation switch 124.

In embodiments of the present invention, the multiple miniature windows 104, 106 and 108 each display only one type of information which can be displayed in the large window one at a time. The multiple (or plurality of miniatures) provide a preview of what information exists. This layout presents the different information in one display screen in a non-confusing manner. Moreover, this multiple miniature invention allows for both terrain and weather information to be displayed using the standard green-yellow-red scheme that pilots are used to without confusing the pilot's understanding of which hazard type is being displayed. Using the multiple miniatures of the present invention, a pilot can choose to view weather in the main window, but still has information about terrain and traffic relative to his or her position. This reduces clutter on the main display screen 100 because only one hazard is presented but also allows the opportunity to maintain situational awareness via the miniature preview screens 104, 106 and 108. In addition, spatial parallelism makes it easier for pilots to integrate information from multiple displays. Moreover, it will be understood that the number of miniature windows will vary according to the number of sets of information provided and that this invention is not limited to three miniature windows.

In embodiments of the present invention, the miniature windows 104, 106 and 108 are adjacent the main display (or window) 101 and the proportions are held constant to allow integration of information across displays. The orientations of the miniature windows 104, 106 and 108 in relation to the main window 101 can vary in position. For example, the miniature windows 104, 106 and 108 can be positioned on the top, right side, left side or bottom of the main window 101. Moreover, in one embodiment, if a pilot zooms in/out on the main display 101, the miniatures 104, 106, 108 are adapted to also zoom in/out by the same factor. In contrast, when using present displays, a pilot must hold information from one display in his or her memory while switching to a new information display thereby increasing the difficulty of comparing the locations of two hazard types on the map. In one embodiment, varying ranges between multiple miniatures and the main display are used. For example, in one embodiment, a TACS range is 10 nm, a weather range is 50 nm and a terrain range is 25 nm. In further embodiments, the ranges are either manually and individually changed or automatically and algorithmically changed according to the crew task (e.g., avoid tactical traffic, adjust range of TCAS) or the range of important information. Further in another embodiment, when a hazard is detected in the information displayed in one of the miniature windows 104, 106 and 108, that information is automatically toggled to the large window 101 to get the pilots attention.

Figure 2:
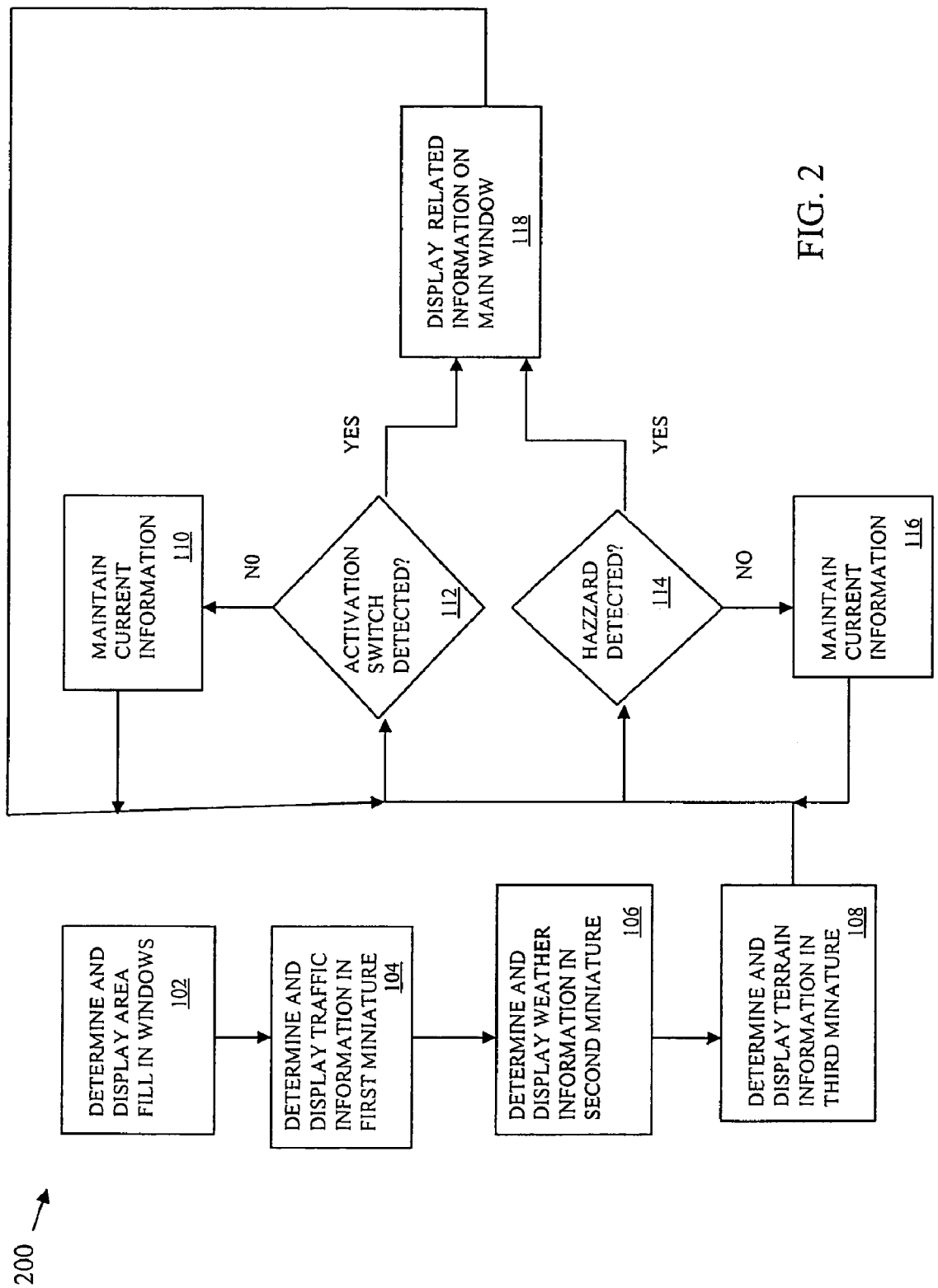
FIG. 2 is a flow diagram of one embodiment of the present invention.

Referring to FIG. 2, a flow diagram 200 of one embodiment of the present invention is illustrated. As illustrated the fill area over a given location is determined and displayed in both the main window and the miniature windows (102). The traffic information is then determined and displayed in a first miniature window (104). The weather is determined and displayed in a second miniature window (106). The terrain is also determined and displayed in the third miniature window (108). Activation switches are then monitored to determine if it is desired to change the information displayed in the main window (112). Any type of switch or the like that creates a change signal can be used to indicate a desired change in the information illustrated in the main window. For example, FIG. 1 illustrates buttons that are depressed to create a change signal. In other embodiments a curser is positioned over a desired miniature window and clicked to create a change signal. If no change signal has been detected (112), the current information in the main display is maintained (110). Moreover, upon activation of the display screen, a select predetermined set of information will be displayed. If a change signal has been detected (112), the new information relating to the change signal is displayed in the main window (118). Also, as indicated in this embodiment, the information is monitored for hazards (114). If a hazard is detected (114), the information relating to the hazard is automatically switched to the main window (118). If a hazard is not detected (114), the current information displayed in the main window is maintained (116).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. An aviation display screen, the display screen comprising:
   a main window adapted to illustrate one set of information; and
   a plurality of miniature windows, each miniature window adapted to display a set of avionic information, the avionic display further adapted to toggle a select set of avionic information in one of the miniature windows into the main window, the information in each miniature window being held proportional to the information displayed in the main window.

2. The display screen of claim 1, wherein the select set of information in each miniature window is one of traffic, weather and terrain.

3. The display screen of claim 1, wherein the main window is larger than each of the plurality of miniature windows.

4. The display screen of claim 1, wherein the information in each miniature window is adapted to zoom in/out by a first factor, and the main window is adapted to zoom in/out by the first factor.

5. The display screen of claim 1, wherein the avionic display is further adapted to automatically display information from a miniature window in the main window when a hazard is detected in the miniature window.

6. The display screen of claim 1, wherein the avionic display is adapted to selectively vary ranges with regard to the information displayed in the miniature windows and the main window.

7. An avionic display screen, the display screen comprising:
   a relatively large window adapted to display a set of avionic information;
   a first miniature window adjacent the relatively large window adapted to display traffic information;
   a second miniature window adjacent the relatively large window adapted to display weather information; and
   a third miniature window adjacent the relatively large window adapted to display terrain information, wherein the set of avionic information displayed in the relatively large window is selected among the first, second and third miniature windows, the display screen further adapted to automatically display information from one or more of the miniature windows in the main window when a hazard is detected in the one or more miniature windows.

8. The display screen of claim 7, wherein the information in each miniature window is held proportional to the information displayed in the relatively large window.

9. The display screen of claim 7, wherein the information in each miniature window is adapted to zoom in/out by the same factor as the information in the main window.

10. The display window of claim 7, wherein the display screen is adapted to selectively vary ranges with regard to the information displayed in the miniature windows and the relatively large window.

11. The display window of claim 10, wherein the traffic information has a range of 10 nm, the weather information has a range of 50 nm and the terrain information has a range of 25 nm.

12. The display window of claim 10, wherein the ranges are adapted to be adjusted manually.

13. The display window of claim 10, wherein the ranges are adapted to be adjusted automatically according to a crew task.

14. A method of displaying avionic information on a single display screen, the method comprising:
   displaying a set of avionic information in each of a plurality of miniature windows on the display screen;
   displaying a select one of the sets of the avionic information from the miniature windows on a main relatively large window on the display screen;
   zooming in/out the information in the main window; and
   zooming in/out the information in each of the plurality of miniature windows in proportion to the information in the main window.

15. The method of claim 14, wherein the sets of avionic information in the miniature windows includes at least one of traffic, weather and terrain.

16. The method of claim 14, further comprising:
   automatically displaying information from one of the plurality of miniature windows in the main window upon detection of a hazard in information in the miniature window.

17. The method of claim 14, further comprising:
   proportionally displaying information in the plurality of miniature windows in relation to the set of information in the main window.

18. The method of claim 14, further comprising:
   varying ranges of the information in the miniature windows and the main window.

19. The method of claim 18, further comprising:
   manually changing one or more of the ranges relating to the information.

20. The method of claim 18, further comprising:
   automatically changing the ranges relating to the information.

21. A method of displaying avionic information on a single display window, the method comprising:
   displaying traffic information in a first miniature window;
   displaying weather information in a second miniature window;
   displaying terrain information in a third miniature window;
   displaying a select one of the traffic, weather and terrain information in a relatively large window that is adjacent the first, second and third miniature windows; and
   varying the ranges of the traffic, weather and terrain information with respect to the associated first, second and third miniature windows and the relatively large window.

22. The method of claim 21, further comprising:
   sending a switch signal to change the information displayed in the relatively large window.

23. The method of claim 21, further comprising:
proportionally displaying information in the plurality of miniature windows in relation to the set of information in the relatively large window.

24. The method of claim 21, further comprising:
setting a traffic information range at 10 nm;
setting a weather range information at 50 nm; and
setting a terrain range at 25 nm.

25. A display to display multiple sets of information simultaneously, the display comprising:
means for displaying a set of avionic information in a main window;
means for displaying a set of avionic information in each of a plurality of miniature windows; and
means for toggling a select set of avionic information in one of the miniature windows into the main window;
means for zooming in/out by a first factor in the main window; and
means for zooming in/out by the first factor in the plurality of miniature windows.

26. The display screen of claim 25, further comprising:
means for holding the information in each miniature window proportional to the information displayed in the main window.

* * * * *